June 3, 1930.  A. W. LISSAUER  1,761,084
INNER CONDUIT SUSPENSION
Filed Dec. 22, 1928
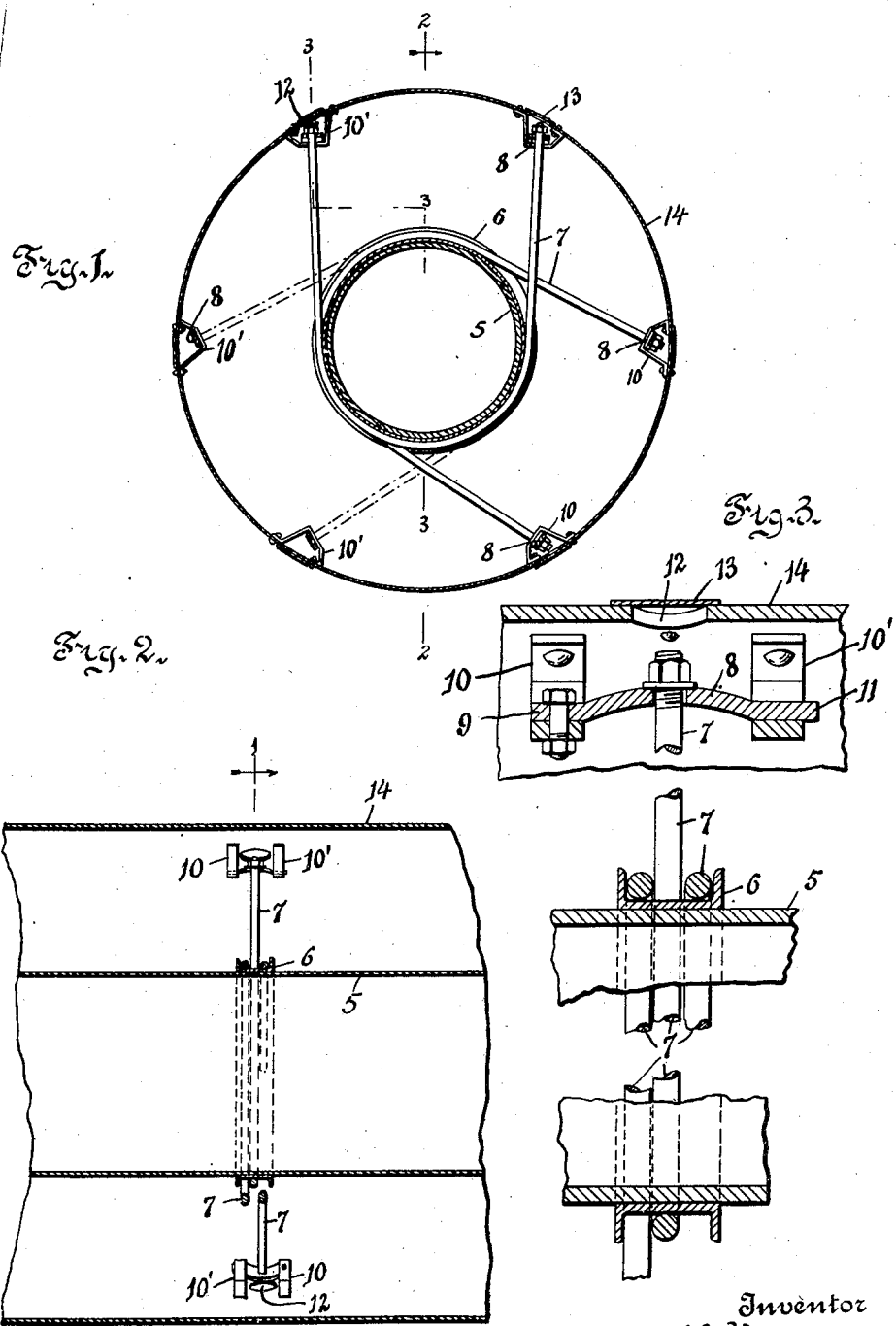
Inventor
A. W. Lissauer
By his Attorney Patented June 3, 1930

1,761,084

UNITED STATES PATENT OFFICE

ADOLPH W. LISSAUER, OF LOUISVILLE, KENTUCKY, ASSIGNOR TO LOUISVILLE DRYING MACHINERY CO. INC., OF JEFFERSON COUNTY, KENTUCKY

INNER-CONDUIT SUSPENSION

Application filed December 22, 1928. Serial No. 327,851.

My invention relates to means for properly suspending inner conduits from outer conduits, and has reference more particularly to the suspension of the inner shell of a dryer from the outer shell of the same.

The suspension employed at present for this purpose consists of links which connect angle clips riveted to the conduits or shells at corresponding points, the connection being made by means of bolts which pass through the clips and the links. Theoretically, this is a simple method of handling the problem, but in actual practice there are a number of difficulties.

In the first place, in as inaccurate a machine as a dryer it is impossible to get perfect circular shells or conduits so that the length of the links and the exact position of the clips cannot be determined beforehand but must be fitted by the cut and try method.

In the second place the uneven expansion under heat of the conduits tends to throw the links out of their original position. This means that the links which are originally installed as the vertical components of a right angle triangle, must form the hypotenuse of the right angle triangle. Under this condition, of course, somethng must give way, and it is usually either the bolt or the hole in the link.

This condition could not be overcome by setting the links at the proper angles because when the conduits are cold, the reverse would be true and the links would then be too long. As soon as any wear or deterioration due to the above condition exists, then with every revolution of the dryer, the lost motion comes into play and the condition becomes worse. It is not unusual for users to have a shut down on dryers of this kind every six months, at a great expense and loss of time, as they have to replace both the links and the clips. Of course, the difficulty in changing these hangers is made greater because of the flights provided on the facing surface of the inner and outer conduits or shells, which reduce the working space therebetween considerably.

To obviate these defects, I provide a suspension which permits a lateral and longitudinal displacement between the two shells, wthout straining the suspension or shells.

In the appended drawing, forming part of this application, Figure 1 is a cross section on line 1—1, Figure 2, of an inner and outer conduit or shells of a dryer provided with a suspension embodyng my invention.

Figure 2 is a longitudinal section on line 2—2, Figure 1, and

Figure 3 is a longitudinal section on line 3—3—3, Figure 1.

Referring to the drawings, the inner shell or conduit 5 at the points where it is to be supported, is provided with an annular channelled ring 6 secured thereto in any suitable way. The channelled portion, which is exterior to the inner shall, forms a guide for a plurality of U shaped hangers 7, each straddling the ring and therefore the inner shell. The ends of each U hanger is threaded and each end projects through an arched plate 8, one end 9 of which plate is anchored to a bracket or clip 10, and the other end 11 of the plate bearing in a similar bracket or clip 10', the brackets being secured to the inner periphery of the outer shell 14, in any suitable way. In consequence, the arched plates 8 form yielding supports for the ends of the U hangers at the outer shell 14.

As will be seen, the series of U hangers engaging the ring 6 are distributed so that together they completely embrace the inner shell and they are so anchored to the outer shell that the strain of all the hangers on the outer shell is substantially uniform. Where the concentricity between the shells is to be properly maintained, a series of three hangers are carried and guided by the ring 6 and Figure 1 illustrates such an arrangement, the missing U hanger being indicated in dash and dot line. But it is self-evident that more or fewer U hangers may be used for special cases.

The threaded ends of the hangers engaged by the arched plates 8 are accessible through openings 12, provided in the outer shell, so that the U hangers can be properly adjusted at any time, the openings 12 of the outer shell being provided with suitable covers 13.

From the above description and drawings, it will be seen that the inner conduit or shell has an enormous contact surface with the hangers, so that the wear is practically nil. The arched plates will yield sufficiently to make up for the difference in length required in the hangers, so that there will be no strain on any part of the same. It will be also seen that these hangers, disposed in a manner as described, will permit both lateral and longitudinal displacement, without materially straining any part of the suspension or the shells.

It will also be seen that the resultant pull or support of any of the U hangers is at an angle to the pull or support of any of the other U hangers, although the resultant pull or support of all the hangers is substantially zero.

I claim—

1. A suspension for an inner shell from an outer shell of a dryer, comprising a series of U hangers, each straddling the inner shell and yielding means securing the ends of the hangers to the outer shell, the plurality of said hangers completely embracing the inner shell.

2. A suspension for an inner shell from an outer shell of a dryer comprising a plurality of U hangers, each straddling the inner shell at different parts of its circumference, and yielding means connecting the said U hangers to the outer shell.

3. A suspension for an inner shell from an outer shell of a dryer comprising a channelled ring secured to the inner shell, a plurality of U shaped hangers, each straddling the ring at a different part of its circumference and each lying in a plane substantially at right angles to the axis of the shells, and yielding means on the inner surface of the outer shell engaging the ends of the hangers.

4. A suspension for an inner shell from an outer shell of a dryer comprising a channelled ring secured to the inner shell, a plurality of U shaped hangers, each straddling the ring at a different part of its circumference, and means connecting yieldingly the ends of the U hangers to the inner surface of the outer shell.

5. A suspension for an inner shell from an outer shell, comprising a channelled ring secured to the inner shell, a plurality of U shaped hangers, each straddling the ring at a different part of its circumference, and for which said hangers said ring forms a guide, a yielding plate at the end of each U hanger, and means secured to the outer shell and supporting each plate, so that one end of said plate is anchored.

6. A suspension for an inner shell from an outer shell of a dryer, comprising a series of adjacently disposed U hangers, each straddling the inner shell so that each hanger lies in a plane substantially at right angles to the axis of the shells, and yielding means for securing the ends of the hangers to the outer shell.

7. A suspension for an inner shell from an outer shell of a dryer, comprising a series of U hangers, each straddling the inner shell, a yielding plate at the end of each U hanger, anchored at one end to the outer shell, and free at the other end from said shell but supported from same.

8. A suspension for an inner shell from an outer shell of a dryer, comprising a series of U hangers, each straddling the inner shell, and a yielding plate at the end of each U hanger, supported by the outer shell on the inner surface thereof.

ADOLPH W. LISSAUER.